UNITED STATES PATENT OFFICE.

SPENCER B. NEWBERRY AND HARVEY N. BARRETT, OF BAYBRIDGE, OHIO.

PROCESS OF MAKING FERTILIZER.

1,174,176. Specification of Letters Patent. Patented Mar. 7, 1916.

No Drawing. Application filed October 21, 1911. Serial No. 655,928.

*To all whom it may concern:*

Be it known that we, SPENCER B. NEWBERRY and HARVEY N. BARRETT, citizens of the United States, residing at Baybridge, Erie county, State of Ohio, have invented certain new and useful Improvements in Processes of Making Fertilizer, of which the following is a specification.

It is well known, as disclosed in patent applications previously filed by us, that natural phosphate rock consisting chiefly of phosphate of lime, may be converted into citrate soluble form by calcination with small amounts of certain alkali-metal salts, for example phosphates or sulfates. The cheapest alkali-metal salts are, however, the chlorids, as common salt and potassium chlorid, and we have long realized that if these could be successfully applied to the calcination of phosphates the cost of the process would be considerably reduced. We have found the chief obstacle in the use of alkali-metal chlorids to be their volatility at comparatively low temperature, in consequence of which they are largely converted into vapor and expelled from the mixture, in calcining under ordinary conditions, at a temperature below that required for conversion of the phosphate into citrate soluble form. We have found it possible to overcome this difficulty and to obtain a practically completely citrate-soluble product, by calcining with alkali-metal chlorid under certain conditions, as follows: The calcination is conducted as a continuous process, preferably in a nearly horizontal revolving kiln heated internally by the combustion of fuel introduced with air at the lower end, although continuous kilns of vertical or other types may be employed. The pulverized mixture of natural phosphate and alkali-metal chlorid is continuously supplied at the upper end of the kiln, travels slowly toward the source of heat, in its passage is gradually raised to the temperature of calcination, and by the revolution of the kiln is continually agitated with exposure of fresh surfaces to contact with the highly heated gaseous products of combustion. The effect of this contact, continued for a considerable time and at gradually increasing temperature, is to decompose a part of the alkali-metal chlorid with liberation of hydrochloric acid or chlorin, which escapes with the stack gases and may be condensed by known methods, while the residue from the decomposition of the chlorid remains in the mixture in the form of alkali-metal compounds which are not volatile except at extremely high temperature, and serve to convert the phosphate, at the zone of high heat, into citrate-soluble form. Such part of the alkali-metal chlorid as remains undecomposed by the action of the gases is volatilized before the zone of highest heat is reached, and for the most part re-deposited in the cooler portion of the kiln; it is thus automatically restored to the mixture and re-exposed to the conditions favorable for its decomposition.

Another method of operation is to introduce pulverized phosphate, without chlorid, at the upper end of the kiln and to supply the alkali-metal chlorid at the lower or discharge end, either in admixture with the fuel, or by a separate feeding appliance, in dry form or in solution in water. In this mode of operating the alkali-metal chlorid is promptly volatilized by the heat of combustion and of the calcined phosphate and in the form of vapor comes into intimate contact with the phosphate at the highest temperature of the kiln. Under these conditions a considerable part of the alkali-metal chlorid is decomposed and the conversion of the phosphate by the action of the alkali resulting from the decomposition is rapid and practically complete. The portion of the chlorid which escapes decomposition is chiefly deposited in the cooler portion of the kiln and thus becomes mixed with the phosphate and reënters the process as above described.

We have found that the decomposition of the alkali-metal chlorid is greatly facilitated by the presence of sulfur dioxid and water vapor in the gases. Under the action of these substances, alkali-metal chlorid is rapidly and completely converted, at a temperature below a red heat, into alkali-metal sulfate and hydrochloric acid. The resulting alkali-metal sulfate is volatile only at very high temperatures, and therefore remains in the mixture until the zone of highest heat is reached. At this point, in contact with the natural phosphate, the sulfate is practically completely decomposed with evolution of sulfur dioxid and oxygen, which serve to decompose fresh portions of alkali-metal chlorid, while the alkali-metal oxid remaining enters into combination with the phosphate and serves to render it citrate soluble. Theoretically, therefore, a very small percentage of sulfur dioxid in the gases is sufficient to decompose a large amount of chlorid, since the sulfur dioxid in the gases tends continually to increase by being absorbed in the cooler parts of the kiln and re-liberated at the zone of highest heat. Practically, owing to loss of sulfur dioxid with the escaping gases, we find it advantageous to increase this constituent by adding to the mixture of natural phosphate and alkali-metal chlorid a small percentage of a sulfate decomposable at the temperature of calcination, such as calcium sulfate or alkali-metal sulfate, or of sulfur or a combustible sulfur compound such as pyrites, or, finally, by employing a fuel high in sulfur. We also find it advantageous to introduce a small amount of steam at the fire-end of the kiln.

The amount of alkali-metal chlorid required to convert the natural phosphate into citrate-soluble form varies with the character of the phosphate and the conditions of calcination. An amount of sodium chlorid equal to from 10 to 20 per cent. of the weight of natural phosphate, or an amount of potassium chlorid equal to from $12\frac{1}{2}$ to 25 per cent. of the weight of natural phosphate, will generally be found to be a suitable proportion. The amount of alkali-metal sulfate or calcium sulfate required will vary from none to one-half the weight of alkali-metal chlorid used.

The several stages of the process may now be briefly re-stated as follows: The mixture of natural phosphate and alkali-metal chlorid, with or without the addition of sulfate, enters at the end of the kiln farthest from the source of heat, and is gradually raised in temperature to the point at which the chlorid is decomposed by the sulfur dioxid and water-vapor contained in the gases, which is from 400° to 500° C. At this point the decomposition of the chlorid with formation of sulfate and hydrochloric acid begins. The mixture continues to increase in temperature as it passes down the kiln, and at about 750° C. the chlorid begins to be converted into vapor and is thus brought into intimate contact with the hot gases and largely converted into sulfate. The unchanged chlorid is, for the most part, deposited in the cooler part of the kiln and thus returned to the mixture. A considerable part of the chlorid is also decomposed directly by contact with the phosphate at high temperature, the alkali of the chlorid remaining in the product as silicate or phosphate, and the chlorin escaping in the free state or as hydrochloric acid. For this reason the addition of sulfate or presence of sulfur dioxid in the gases is not essential. At a white heat the conversion of the phosphate, by the action of the alkali, into citrate-soluble form takes place, and the alkali-metal sulfate is decomposed with liberation of sulfur dioxid. The phosphate finally issues from the kiln in the form of porous fragments, containing a small percentage of alkali, generally from 3 to 5 per cent., and practically free from sulfates or chlorids. The gases escaping from the kiln contain a small percentage of hydrochloric acid and a little sulfur dioxid. These may be removed by a spray of water, according to well-known methods, for the sake of prevention of possible nuisance or with a view to their utilization.

Having thus described the invention what we claim as new and desire to secure by Letters-Patent is:

1. The process of making fertilizer by calcining natural phosphate of lime with alkali-metal chlorid and a substance yielding sulfur dioxid at the temperature of calcination.

2. The process of making fertilizer by calcining natural phosphate of lime with alkali-metal chlorid in such manner that the mixture of natural phosphate and alkali-metal chlorid shall travel continuously toward the source of heat and shall be gradually raised to a nearly white heat, and during the heating shall be continually agitated with exposure of fresh surfaces to contact with the products of combustion.

3. The process of making fertilizer by calcining natural phosphate of lime with alkali-metal chlorid in such manner that the mixed materials shall travel continuously toward the source of heat and shall be gradually raised to a nearly white heat, and during the heating shall be continuously agitated in contact with gaseous products of combustion containing sulfur dioxid and water-vapor.

4. The process of making fertilizer which consists in calcining natural phosphate of lime with alkali-metal chlorid, at a gradually increasing heat, in an atmosphere of products of combustion containing sulfur dioxid and water vapor, so that the alkali-metal chlorid shall first be decomposed with formation of alkali-metal sulfate and liberation of hydrochloric acid, and that the alkali-metal sulfate so formed shall at higher temperature be decomposed with liberation of sulfur dioxid.

5. The process of making fertilizer which consists in calcining natural phosphate of lime with alkali-metal chlorid, at a gradually increasing heat, in an atmosphere of products of combustion containing sulfur dioxid and water vapor, so that the alkali-metal chlorid shall first be decomposed with formation of alkali-metal sulfate and liberation of hydrochloric acid, and that the alkali-metal sulfate so formed shall at higher temperature be decomposed with liberation of sulfur dioxid, and condensing the hydrochloric acid evolved.

6. The process of making fertilizer by mixing natural phosphate of lime with alkali-metal chlorid and exposing the mixture to heat which is slowly and gradually increased up to nearly white heat.

7. The process of making fertilizer by mixing natural phosphate of lime with alkali-metal chlorid, exposing the mixture for a considerable time to a temperature below that of volatilization of the alkali-metal chlorid, and finally calcining the mixture at nearly white heat.

8. The process of making fertilizer by mixing natural phosphate of lime with alkali-metal chlorid, exposing the mixture for a considerable time to a temperature slowly increasing up to a red heat, and finally calcining the mixture at nearly white heat.

In testimony whereof we affix our signatures in presence of two witnesses.

SPENCER B. NEWBERRY.
HARVEY N. BARRETT.

Witnesses:
HATTIE M. MEGGETT,
IRVIN H. NUBER.